United States Patent [19]

Cohen et al.

[11] Patent Number: 5,185,421
[45] Date of Patent: Feb. 9, 1993

[54] FLUORINATED HYDROXY-CONTAINING MACROMONOMERS

[75] Inventors: Gordon M. Cohen, Wynnewood, Pa.; William B. Farnham, Hockessin; Andrew E. Feiring, Wilmington, both of Del.

[73] Assignee: E. I. Du Pont de Nemours and Company, Wilmington, Del.

[21] Appl. No.: 740,274

[22] Filed: Aug. 5, 1991

[51] Int. Cl.⁵ .............................................. C08G 18/28
[52] U.S. Cl. ................................. 528/70; 528/110; 528/299; 528/372; 568/615; 568/842; 526/247; 525/415
[58] Field of Search ............... 568/615, 842; 526/247; 528/70, 110, 299, 372; 525/445

[56] References Cited

U.S. PATENT DOCUMENTS 4,982,009  1/1991  Hung ................................. 568/615

FOREIGN PATENT DOCUMENTS 63-002418  1/1988  Japan .

*Primary Examiner*—John Kight, III
*Assistant Examiner*—Duc Truong

[57] ABSTRACT

Disclosed are fluorinated macromonomers containing one or more hydroxy groups, which are useful as monomers in other polymerization. Also disclosed are processes and an intermediate for making such macromonomers, and condensation and free radically made polymers which contain the macromonomers. The macromonomers are useful for modifying the properties of the polymers into which they are incorporated.

86 Claims, No Drawings

FLUORINATED HYDROXY-CONTAINING MACROMONOMERS

FIELD OF THE INVENTION

This invention concerns hydroxy-containing fluorinated macromonomers which are particularly useful as comonomers for modifying the properties of polymers. Also disclosed are processes for making such macromonomers and polymers in which the macromonomers are incorporated.

BACKGROUND OF THE INVENTION

Macromonomers (sometimes also called "macromers") can be defined as "polymer of molecular weight ranging from several hundred to tens of thousands with a functional group F at the chain end that can further polymerize" (quotation from H. Mark, et al., Ed., Encyclopedia of Polymer Science and Engineering, Vol. 9, John Wiley & Sons, New York, 1987, p. 195). When the macromonomer is fluorinated and incorporated as a monomeric unit in a polymer, the macromonomer may modify the physical properties of the polymer. For example incorporation into an otherwise nonfluorinated polymer may render the polymer surface more hydrophobic and oleophobic. It is the object of this invention to provide readily prepared fluorinated macromonomers, processes for making them, and polymers incorporating the macromonomers as monomeric units.

Commonly assigned U.S. Pat. No. 4,982,009 describes the polymerization of selected hydroxy containing trifluorovinyl ethers with bases. Commonly assigned U.S. patent application Ser. No. 07/713,911, filed Jun. 12, 1991, describes the polymerization of the same compounds using other catalysts, as well as bases. Neither the patent nor the application suggest or utilize processes by which the macromonomers claimed herein are made. Japanese Patent 88002418 discloses the reaction of 1,2-dichloro-7,7-dihydro-7-hydroxy(perfluoro-3-oxaheptane) with zinc to give 7,7-dihydro-7-hydroxy-(perfluoro-3-oxahepten-1). No mention is made of using a compound other than this six carbon species.

SUMMARY OF THE INVENTION

This invention concerns a macromonomer of the structure:

wherein:
z is 2, 3 or 4;
Q is hydrocarbyl, or fluorine or ether substituted hydrocarbyl;
and each [D$^1$], independently, has the formula $$[CF_2CH_2(OCF_2CHFOR^4CF_2CH_2)_n—OH]$$

wherein
R$^4$ is perfluoroalkylene;
n is 0 to about 30; and
provided that:
at least one of said n is one or more.

This invention also concerns a macromonomer of the formula $$CF_2\!=\!CFOR^4CF_2CH_2O—(CF_2CFHOR^4CF_2CHO)_m—H$$

wherein:

m is 1 to about 30; and
R$^4$ is perfluoroalkylene.
This invention also concerns a compound of the formula

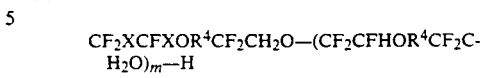

wherein:
m is 1 to about 30;
R$^4$ is perfluoroalkylene; and
X is chlorine or bromine.

This invention also concerns a process for the production of a macromonomer, comprising, contacting a compound of the formula Q(CF$_2$CH$_2$OH)$_z$ with a compound of the formula CF$_2\!=\!$CFOR$^4$CF$_2$CH$_2$OH and a catalyst for the polymerization of hydroxy containing trifluorovinyl ethers, wherein:
Q is hydrocarbyl or fluorine or ether substituted hydrocarbyl;
z is 2, 3 or 4;
R$^4$ is perfluoroalkylene.

This invention also concerns a process for the production of a macromonomer, comprising, contacting a compound of the formula CF$_2$XCFXOR$^4$CF$_2$CH$_2$OH with a compound of the formula CF$_2\!=\!$CFOR$^4$CF$_2$C-H$_2$OH and a catalyst for the polymerization of hydroxy containing trifluorovinyl ethers, then dehalogenating the resulting polymer, and wherein:
X is chlorine or bromine; and
R$^4$ is perfluoroalkylene.

This invention also concerns a condensation polymer comprising the repeat unit

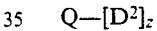

wherein:
Q is hydrocarbyl or fluorine or ether substituted hydrocarbyl;
z is 2, 3 or 4; and
each —[D$^2$] independently has the formula $$[CF_2CH_2(OCF_2CHFOR^4CF_2CH_2)_n—O—]$$

wherein
R$^4$ is perfluoroalkylene;
n is 0 to about 30;
provided that at least one of said n is one or more.

This invention also concerns a free radically polymerized polymer, comprising, the repeat unit

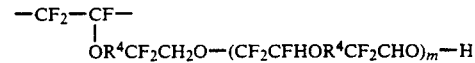

wherein:
R$^4$ is perfluoroalkylene; and
m is 1 to about 30.

This invention also concerns a block copolymer in which at least one of the blocks has the structure

wherein;
Q is hydrocarbyl or fluorine or ether substituted hydrocarbyl;
z is 2, 3 or 4; and
each [D$^2$] independently has the formula

[CF$_2$CH$_2$(OCF$_2$CHFOR$^4$CF$_2$CH$_2$)$_n$—O—]

wherein

R$^4$ is perfluoroalkylene;

n is 0 to about 30; and provided that at least one of said n is one or more.

DETAILS OF THE INVENTION

In all of the above processes and compositions, the term "perfluoroalkylene" means a bivalent saturated radical regarded as derived from a perfluoroalkane by the removal of two fluorine atoms. A "perfluoroalkylene" group may also contain oxygen atoms between alkylene segments, to form one or more ether groups in each perfluoroalkylene group.

For all compositions and processes herein, a preferred R$^4$ is —(CF$_2$)$_s$— wherein s is an integer of 1 to 10; or R$^4$ is —[CF$_2$CF(CF$_3$)O]$_t$(CF$_2$)$_u$—, wherein u is an integer of 1 to 10 and t is an integer of 1 to 20. In especially preferred embodiments t is 1 and u is 1, or s is 2.

Two macromonomers and processes for making them are disclosed herein. One of these is a di-, tri-, or tetra-hydroxy containing macromonomer of the structure Q—[D$^1$]$_z$ (Q—[CF$_2$CH$_2$(OCF$_2$CHFOR$^4$CF$_2$CH$_2$)$_n$—OH]$_z$), which will be referred to herein as the polyhydroxymacromonomer, and a macromonomer of the formula CF$_2$=CFOR$^4$CF$_2$CH$_2$O—(CF$_2$CFHOR$^4$CF$_2$CHO)$_m$—H, which will be referred to herein as the monohydroxymacromonomer. Q, R$^4$, n, z, and m are as defined above.

Both the polyhydroxymacromonomer and the monohydroxymacromonomer are made by the polymerization of a hydroxy containing trifluorovinyl ether in the presence of a "catalyst for the polymerization of hydroxy containing trifluorovinyl ethers". Such catalysts are known in the art, and are disclosed in commonly assigned U.S. Pat. No. 4,982,009 and commonly assigned U.S. patent application 07/713,911 now U.S. Pat. No. 5,134,211, filed Jun. 12, 1991, both of which are hereby included by reference. Such catalysts include, but are not limited to, bases such as alkali metal alkoxides and hydrides, and other compounds such as an alkali metal carbonate or cesium fluoride. Preferred polymerization conditions, applicable to the claimed processes herein, are also disclosed in the above references. These conditions include preferred temperature ranges, the optional use of solvent and the type of solvent useful.

In order to produce the polyhydroxymacromonomer, the compound Q(CF$_2$CH$_2$OH)$_z$ is also present. For all compositions and processes herein it is also preferred if z is 2. In a preferred embodiment, Q is perfluoroalkyl, and it is more preferred if Q is α,ω-perfluoro-n-alkylene, as for example in the compound 2,2,3,3,4,4-hexafluoro-1,5-pentanediol.

It will be understood by those skilled in the art that the values of m and n are averages, representing molecular weight distributions, and that m and n are the arithmetic average number of monomer units in each polymeric chain. The values of m and n are controlled by the molar ratios of the ingredients of the polymerization reaction of the process. Thus, for the polyhydroxymacromonomer, the value of n (assuming complete polymerization) is:

$$\frac{\text{moles of hydroxy containing trifluorovinyl ether}}{(\text{moles of } Q(CF_2CH_2OH)_z \times z)}$$

For the monohydroxymacromonomer the value of m (assuming complete polymerization) is:

$$\frac{\text{moles of hydroxy containing trifluorovinyl ether}}{\text{moles of halogenated alcohol}}$$

For m or n, it is preferred if they are about 2 to about 10.

The compound CF$_2$XCFXOR$^4$CF$_2$CH$_2$OH can be made by the chlorination or bromination of CF$_2$=CFOR$^4$CF$_2$CH$_2$OH (Experiment 1) or by the reduction of the corresponding ester CF$_2$XCFXOR$^4$CF$_2$CH$_2$CO$_2$R$^2$, where R$^2$ is alkyl. For typical reduction procedures see Japanese Patent No. 88002418 and U.S. Pat. No. 4,564,717.

The dehalogenation reaction (end group only shown) for making the monohydroxymacromonomer,

CF$_2$XCFXO— → CF$_2$=CFO—, can be carried out by various methods. For example, the compound can be reacted with zinc to remove the halogen. Such a procedure is described in Example 3 herein (which describes a special procedure for activating the zinc).

The compound CF$_2$XCFXOR$^4$CF$_2$CH$_2$O—(CF$_2$CFHOR$^4$CF$_2$CHO)$_m$—H is useful as an intermediate for making the monohydroxymacromonomer.

Both the polyhydroxymacromonomer and the monohydroxymacromonomer may be incorporated as repeat (monomeric) units into other polymers. The macromonomer will be one of several repeat units in the polymer. Such polymers are useful in themselves as elastomers or molding resins, depending on whether they are elastomeric or plastic at room temperature. The macromonomers may impart particular properties to otherwise nonfluorinated polymers such as hydrophobicity and oleophobicity. The presence of the macromonomers may also make the polymers useful as compatibilizers between "hydrocarbon" and "fluorocarbon" polymers. Only relatively small amounts of macromonomer may need to be present in the polymer to obtain these properties.

The polyhydroxymacromonomer may be incorporated into condensation polymers, such as polyurethanes (which includes polyurethanes having some urea linkages, sometimes called poly urea/urethanes) or polyesters, through reaction of the hydroxyl groups. The hydroxyl group may react with a variety of groups such as isocyanate, epoxy, carboxylic anhydride, ester, chloroformate, etc. The repeat unit of the polymer formed derived from the polyhydroxymacromonomer is the structure Q—[D$^2$]$_z$ (Q—[CF$_2$CH$_2$(OCF$_2$CHFOR$^4$CF$_2$CH$_2$)$_n$—O—]$_z$), as described above. It is preferred if this repeat unit is part of a polyester or a polyurethane, see Examples 6 and 7 herein.

The monohydroxymacromonomer may be incorporated into a free radically polymerized polymer. Such types of polymerization, utilizing for example various vinyl monomers, including fluorinated monomers, and ethylene, are well known to those skilled in the art. The unit derived from the monohydroxymacromonomer in these polymerizations is

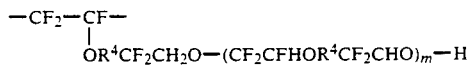

$$\text{OR}^4\text{CF}_2\text{CH}_2\text{O}-(\text{CF}_2\text{CFHOR}^4\text{CF}_2\text{CHO})_m-\text{H}$$

In this case the reactive group that takes part in the polymerization is the trifluorovinyl ether group. The incorporation of this unit into the polymer allows the polymer to be crosslinked by reaction of the hydroxyl group on the side chain. This is especially valuable for fluorinated polymers, which are often difficult to crosslink, so it is preferred if at least one other monomeric unit in the polymer contains fluorine. A typical free radically polymerized polymer containing a monohydroxymacromonomer unit is illustrated in Example 8.

Block copolymers may also be made from the polyhydroxymacromonomer. For example, the hydroxy groups, or their anions, may be used to initiate polymerizations, with the result that the polyhydroxymacromonomer will become the "B" block of an A—B—A or A—B copolymer, and the monomers initiated by the macromonomer will be the A block. Suitable monomers include lactones, especially epsilon-caprolactone (see Example 9). The block that is derived from the polyhydroxymacromonomer has the formula $$Q-[\text{CF}_2\text{CH}_2(\text{OCF}_2\text{CHFOR}^4\text{CF}_2\text{CH}_2)_n-O-]_z,$$

wherein Q, $R^4$, n and z, and their preferred embodiments, are as defined above.

In the following Experiments and Examples, the following abbreviations are used:
DABCO—1,4-diazabicyclooctane
dibromoEVEOH—perluoro(8,9-dibromo-5-methyl-4,7-dioxa-9,9-dihydrononan-1-ol)
DMF—N,N-dimethylformamide
EVEOH—perfluoro(9,9-dihydro-9-hydroxy-3,6-dioxa-5-methylnon-1-ene)
F113—1,1,2-trichloro-1,2,2-trifluoroethane
Mn—number average molecular weight
Mw—weight average molecular weight
TAS—tris(dimethylamino)sulfonium
THF—tetrahydrofuran

EXPERIMENT 1

Preparation of Dibromo EVEOH

EVEOH (7.85 g, 19.9 mol) was treated in small portions with bromine (3.2 g, 20 mmol), controlling the temperature at 15°-22° C. When the reaction was judged to be complete by GC analysis, excess bromine was removed under a stream of nitrogen and the product was isolated by kugelrohr distillation, 50°/0.2 mm, providing 8.70 g of product. $^{19}$F NMR (THF-$d_8$): −64.13 (m, 2F, CF$_2$Br), −72.2 (apparent doublet of quartets, Jd=24, J=9) and −72.55 (apparent doublet of quartets, J=23, 9 Hz, 2F CFBr for two diastereomers), −80.5 to −86.2 (groups of overlapping AB patterns, 4F, OCF$_2$), −79.4 (apparent quartet, J=9, 3F), −125.38 (t, J=14.8, 2F), −145.4 (m, 1F, tertiary CF), consistent with the desired dibromoalcohol.

EXAMPLE 1

Preparation of Dibromoalcohol

A mixture of EVEOH (2.0 g, 5.08 mmol) and dibromo EVEOH (83 mg, 0.15 mmol) was treated with cesium fluoride (10 mg) in a vial. This was sealed and heated at 120° C for 15 hr. $^{19}$F NMR (THF-$d_8$): −80.0 (s, and minor s at −79.5, a=35), −82.5 to −85.0 (OCF$_2$ AB patterns, a=48), −90.7 (center of AB pattern, J=150 Hz, a=21), −123.7 (m, a=22), −145.0 and −145.7 (d of multiplets, a=22), minor end signals at −125.7 (a=1), −64.25 (t, J=9, a=0.6), and −72.5 (m, a=0.3). Size exclusion analysis showed the major peak with Mw=13100 and Mn=8370, in good agreement with $^{19}$F NMR end-group analysis.

EXAMPLE 2

Preparation of Dibromoalcohol

A mixture of EVEOH and dibromo EVEOH as described in Example 1 was treated with cesium carbonate (8 mg) and heated at 120° C. for 64 hr. $^{19}$F NMR spectrum was as described in Example 1 and indicated Mn=9,100. Size exclusion analysis showed Mw=14700 and Mn=9510.

EXAMPLE 3

Preparation of Monohydroxymacromonomer

To achieve the desired transformation, the dibromoalcohol of Example 1 or 2 was dissolved in F113, washed with water containing a small amount of hydrochloric acid, dried, stripped and pumped. Toluene was added and solvent was again removed.

Zinc dust (630 mg, 9.6 mmol) and dry DMF (4 mL) was treated with 1,2-dibromoethane (288 mg, 1.5 mmol) and the mixture was stirred for 0.5 hr at ambient temperature. A 6.0 g sample of dibromoalcohol in DMF (10 mL) was added and the mixture was stirred for 1.0 hr at 25° C. The reaction mixture was filtered, and solid was rinsed with DMF. The filtrate was added to water and the resulting supernatant was decanted. Product was rinsed several times with water, dissolved in F113 and washed again with water, dried and stripped to give 4.9 g of desired product. $^{19}$F NMR (THF-$d_8$) featured −79.8 (s, CF$_3$), −82.1 to −84.6 (OCF$_2$ AB patterns), −89 to −91.2 (OCF$_2$ AB patterns), −123.3 (CF$_2$CH$_2$O), −144.8 and −145.8 (m and d of m's, tertiary CF and CHF), and trifluorovinyl end group signals at −113.1 (dd, J=66,86), −121.4 (dd, J=86, 113), and −136.1 (d of d of triplets, Jd=66, 113), −125.2 (m, terminal CF$_2$CH$_2$OH) Integration was in reasonable agreement with size exclusion analysis which showed Mw=11800 and Mn=7360.

EXAMPLE 4

Preparation of Polyhydroxymacromonomer

A mixture of EVEOH (3.0 g, 7.6 mmol) and 2,2,3,3,4,4-hexafluoropentane-1,5-diol (212 mg, 1.0 mmol) was treated with cesium carbonate (10 mg) in a vial, sealed, and heated at 120° C. for 18 hr. An additional 10 mg of Cs$_2$CO$_3$ was added and heating was continued for 18 hr. $^1$H NMR (THF-$d_8$) showed 6.69 (d of m's, J=51 Hz, CHF, a=28), 5.21 (bd s, OH, a=7), 4.62 (pseudotriplet, internal CH$_2$O, a=58), 3.95 (t, 3.95, t, J=15 Hz, terminal CH$_2$OH). $^{19}$F NMR spectrum was especially useful for determining Mn and featured the following shifts and assignments: for C$_5$F$_6$H$_4$ fragments, in-chain {CF$_2$CH$_2$=−120.3, central CF$_2$=125.1} and terminal {OCF$_2$CF$_2$=−120.7, −122.0, central CF$_2$=−126.0}; for EVEOH-derived fragments, in-chain CF$_2$CH$_2$O=−123.7, terminal CF$_2$CH$_2$OH=−125.7. Size exclusion analysis showed the major peak with Mw=4060, Mn=3120 using polystyrene standards.

EXAMPLE 5

Preparation of Polyhydroxymacromonomer

EVEOH (40 g) and hexafluoropentane-1,5-diol (2.82 g) in a 3-n rbf maintained under $N_2$ atmosphere were treated with cesium carbonate (300 mg) and heated slowly from 62° C. to 120° C., maintained at 120° C. for 18 hr. Product was dissolved in $F_{113}$ (700 mL), washed with 2N HCl, water, and dried. The organic layer was treated with activated charcoal, filtered through celite, stripped, and subjected to kugelrohr distillation to remove lower-boiling components, chiefly EVEOH. cyclic dimers. There was obtained 37.8 g of colorless, viscous oil.

EXAMPLE 6

Preparation of a Polyurethane

A solution of toluene diisocyanate (240 mg) in THF (10 mL) was treated with 1.0 mL of a solution of DABCO in THF (6 mg/100 mL). A solution of polyhydroxymacromonomer of Example 5 (3.00 g, Mn=3200) in THF (15 mL) was added and the mixture was heated to reflux for 18 hr. Since $^1$H NMR analysis revealed almost no reaction, an additional 3 mg of DABCO was added and the mixture was stirred for 18 hr. $^1$H NMR analysis showed essentially complete consumption of the $CF_2OH$ ends. A solution of ethylene diamine (15 uL) and cyclohexanediamine (3 uL) in THF was added and the mixture was stirred at 25° C. for 48 hr. The mixture was then heated to distill most of the solvent, and the residue was heated at 95°-100° C. for 18 hr. A rather hard, elastomer was produced which showed good thermal stability to 225° C. (air), and Tg ca. $-40°$. A film was melt pressed at 190° C. Water contact angle was determined as 95°. Tensile properties were determined as denier/tenacity/elongation/modulus = 8070/0.032 g/d/172%/0.013.

EXAMPLE 7

Preparation of Polyester

A sample of polyhydroxymacromonomer of Example 5 (4.28 g, Mn=3120) was treated with hexamethyldisilazane (7 mL) and the two-phase mixture was stirred at 50° C. for 1.5 hr. $^1$H NMR analysis showed only 50% conversion, so the isolated oligomer was treated with an additional 7 mL hexamethyldisilazane and 0.1 mL trimethylsilyl chloride and heated at 70° C. for 2 hr. Volatiles were removed under vacuum. $^1$H NMR (THF-$d_8$) showed: 6.7 (overlapping doublet of m's, CHF, J=51), 4.64 (t, in-chain $CF_2CH_2O$), 4.10 (t, J=15), 0.19 (s, $CH_3$), consistent with the desired silyl ether.

A sample of the above bis(trimethylsilyl)ether (1.00 g, 0.32 mmol) was treated with terephthaloyl fluoride (54 mg) and TAS trimethyldifluorosilicate (10 mg), and the mixture was heated to 80° C. for 18 hr. An aliquot was removed, freed of solvent, and analyzed by $^1$H and $^{19}$F NMR. $^1$H: 8.2 (s, aromatic CH), 6.72 (d of m's, CHF), 4.96 (t, J=14, $CH_2OC(O)$), 4.65 (t, J=14, $CH_2OCF_2$). $^{19}$F: $-80.0$ (s), $-83.3$ and $-84.0$ (centers of unresolved AB patterns), $-90.6$ (center of overlapping AB patterns), minor signals at $-119.4$, $-120.3$, $122.8$, $-123.8$ (s, $CF_2CH_2O$), $-125.0$, and $-145.0$ and $-145.8$ (d of m's, tertiary CF and CHF). Spectrum was thus similar to that of the polyhydroxymacromonomer but exhibited different shifts for those nuclei nearest the ester linkages. IR showed large bands 1050-1300 and ester C=O at 1743 cm$^{-1}$;

EXAMPLE 8

A sample (4.9 g) of the monohydroxymacromonomer of Example 3 dissolved in 4 ml of $F_{113}$ was added to a 75 ml bomb chilled to $-20°$ C. Then, 2 ml of a 0.055M solution of perfluoro(propionyl peroxide) in $F_{113}$ was added. The bomb was cooled and evacuated, and then 5 g of TFE (tetrafluoroethylene) was added. The bomb was then heated at 60° C. for 6 hr.

Upon opening the bomb, the product was separated into two portions, a semi-solid white material and $F_{113}$ solution (and rinse). The $F_{113}$ was stripped and the two portions combined. After removing the volatiles under vacuum the crude product weighed 6.73 g. This product was then extracted several times with diethyl ether. The ether soluble portion, after removing volatiles under vacuum, weighed 3.19 g, and had no signals in the NMR for trifluorovinylether moieties.

The ether insoluble portion weighed 3.35 g. A thermogravimetric analysis showed this sample to be stable to about 360° C., and from about 360° C. to about 390° C. it lost about 15% by weight, and then was stable again until about 510° C. Differential scanning calorimetry showed a melting transition at about 328° C. These data are indicative of about 12-15% by weight incorporation of the monohydroxymacromonomer into the polyTFE.

EXAMPLE 9

All glassware and magnetic stirring bar was dried overnight at 160° C. A stoppered 3-neck 25-ml r.b. flask was cooled to room tempereature under argon, and then charged with 2.5 g of the macrodiol of Example 5 (an oil-like material), keeping the flask stoppered as much as possible. The stirring bar was briefly allowed to cool and then added. With an argon atmosphere maintained in the apparatus, a reflux condenser with argon inlet on top of it was placed on the flask. Through a side-arm of the flask, with argon flush, were added two drops of stannous octoate and then, from a syringe, 4.9 ml (5.0 g) of distilled ε-caprolactone. The mixture was stirred and heated 1 hr at 75° C., then 4 hr at 150° C., and finally left unstirred overnight at room temperature.

The solid crude product was removed from the flask by dissolving in 100 ml of toluene at 70° C., the solution concentrated to about 45 ml at that temperature with a nitrogen purge. The solution was clear when hot but got cloudy when cooled to room temperature. Polymer was precipitated as a powdery solid by adding the solution to a 5-fold volume of 1,1,2-trichloro-1,2,2-trifluoroethane (Freon ® 113). The precipitate, 26B, weighed 5.3 g after being allowed to air-dry under ambient conditions. The filtrate, 26A, weighed 1.2 g after the solvent evaporated from it, under ambient conditions, and consisted of an oil mixed with crystals. The filtrate gave a cloudy mixture in toluene at room temperature, like the starting macrodiol and the crude reaction product. The precipitate, 26B, gave a clear solution, demonstrating that it contains little or no free macrodiol. A portion of the precipitate, to be used in elemental analyses and size exclusion chromatography, was additionally dried overnight at 45° C. in a vacuum oven with a nitrogen bleed.

Elemental analyses demonstrated that the precipitate, 26B, contained 20-25 wt % of the starting macrodiol.

Elemental analysis, in duplicate, of the starting macrodiol showed: C, 24.2%; H, 0.71%; F, 59.7%. Elemental analysis, in duplicate, of the precipitate, 26B, showed: C, 54.2%; H, 6.82%; F, 12.4%. Using the theoretical elemental analysis of poly-CL (C, 63.1%; H, 8.83%; F, 0%) and the measured values for the starting macrodiol, it can be calculated from the %F measured in the precipitate, 26B, that this precipitate contained 21 wt % of the macrodiol. Similar calculations using %C and %H gave, respectively, 23% and 26% macrodiol in the precipitate.

Size exclusion chromatography (SEC) showed that there was no starting macrodiol in the precipitate, 26B. Thus the fluorine content indicated by elemental analysis must be attributed to a fluorinated species chemically linked to polycaprolactone, rather than a simple mixture. With a refractive index (RI) detector, the macrodiol was found to have an elution volume of 46-52 ml and gave a negative peak; it was not ultraviolet-active at 230 nm and thus did not give a peak when the UV detector was used. The precipitate, 26B, exhibited a major positive peak at 36-51 ml with both RI and UV detectors and no negative peak corresponding to the macrodiol with the RI detector. There was no significant difference between results obtained from the RI and UV detectors, indicating that there was little or no free macrodiol, because this macrodiol gave a different response for each detector, as indicated above. RI measurements vs. polystyrene standards indicated for precipitate 26B, $M_n = 14,700$ and $M_w = 26,200$, and UV measurements indicated $M_n = 13,900$ and $M_w = 25,000$ ($M_n$ of starting macrodiol was about 3200). Even a little of the free macrodiol could be readily detected by SEC: a mixture containing 90 wt % of the precipitate and 10 wt % of the starting macrodiol showed a significant negative peak with the RI detector where the macrodiol eluted, and nothing at this elution time with the UV. This extra peak made a significant difference between RI and UV measurements, giving $M_n = 19,700$ and $M_w = 28,700$ (RI) and $M_n = 13,700$ and $M_w = 25,300$ (UV). SEC was conducted in THF at room temperature with five linear Phenogel columns, 300 mm long and 7.8 mm I.D., under 28 bar pressure and a 1.0 ml/min flowrate. The UV detector was used at 230 nm.

A 1.0-g portion of the precipitate, 26B, was further purified by dissolving it in 5.0 ml of toluene and pouring the solution into 25 ml of well-stirred Freon ® 113. The precipitate, 69B, was removed by vacuum filtration and rinsed 3 times with Freon ® 113. The precipitate and the filtrate, 69A, were both allowed to air-dry overnight and then were dried further at 45° C. overnight in a vacuum oven with nitrogen bleed. The precipitate, 69B, weighed 0.83 g, and the filtrate, 69A, 0.05 g. Proton nmr spectroscopic analysis of the precipitate, 69B, and comparison with the first precipitate, 26B, indicated that only a little of the fluorinated species was lost during this second precipitation.

Although preferred embodiments of the invention have been described hereinabove, it is to be understood that there is no intention to limit the invention to the precise constructions herein disclosed, and it is to be further understood that the right is reserved to all changes coming within the scope of the invention as defined by the appended claims.

What is claimed is:

1. A macromonomer of the structure $$Q-[D^1]_z$$

wherein:

z is 2, 3 or 4;

Q is hydrocarbyl or fluorine or ether substituted hydrocarbyl; and each [$D^1$] is independently $$[-CF_2CH_2(OCF_2CHFOR^4CF_2CH_2)_n-OH]$$

wherein:

n is 0 to about 30;

$R^4$ is perfluoroalkylene; and provided that at least one of said n is one or more.

2. The macromonomer as recited in claim 1 wherein said z is 2.

3. The macromonomer as recited in claim 1 wherein said n is about 2 to about 10.

4. The macromonomer as recited in claim 2 wherein said n is about 2 to about 10.

5. The macromonomer as recited in claim 1 wherein said $R^4$ is $-(CF_2)_s-$, wherein s is an integer of 1 to 10.

6. The macromonomer as recited in claim 2 wherein said $R^4$ is $-(CF_2)_s-$, wherein s is an integer of 1 to 10.

7. The macromonomer as recited in claim 1 wherein said $R^4$ is $-[CF_2CF(CF_3)O]_t(CF_2)_u-$, wherein u is an integer of 1 to 10 and t is an integer of 1 to 20.

8. The macromonomer as recited in claim 2 wherein said $R^4$ is $-[CF_2CF(CF_3)O]_t(CF_2)_u-$, wherein u is an integer of 1 to 10 and t is an integer of 1 to 20.

9. The macromonomer as recited in claim 7 wherein said t is 1 and said u is 1.

10. The macromonomer as recited in claim 8 wherein said t is 1 and said u is 1.

11. The macromonomer as recited in claim 4 wherein said $R^4$ is $-[CF_2CF(CF_3)O]_t(CF_2)_u-$, wherein u is 1 and t is 1.

12. The macromonomer as recited in claim 5 wherein said s is 2.

13. The macromonomer as recited in claim 6 wherein said s is 2.

14. A macromonomer of the formula $$CF_2=CFOR^4CF_2CH_2O-(CF_2CFHOR^4CF_2CHO)_m-H$$

wherein:

m is 1 to about 30; and $R^4$ is perfluoroalkylene.

15. The macromonomer as recited in claim 14 wherein said m is about 2 to about 10.

16. The macromonomer as recited in claim 14 wherein said $R^4$ is $-(CF_2)_s-$, wherein s is an integer of 1 to 10.

17. The macromonomer as recited in claim 14 wherein said $R^4$ is $-[CF_2CF(CF_3)O]_t(CF_2)_u-$, wherein u is an integer of 1 to 10 and t is an integer of 1 to 20.

18. The macromonomer as recited in claim 17 wherein said t is 1 and said u is 1.

19. The macromonomer as recited in claim 16 wherein said s is 2.

20. The macromonomer as recited in claim 15 wherein said $R^4$ is $-(CF_2)_s-$, wherein s is an integer of 1 to 10.

21. The macromonomer as recited in claim 15 wherein said $R^4$ is $[CF_2CF(CF_3)O]_t(CF_2)_u-$, wherein u is an integer of 1 to 10 and t is an integer of 1 to 20.

22. The macromonomer as recited in claim 21 wherein said t is 1 and said u is 1.

23. A compound of the formula $$CF_2XCFXOR^4CF_2CH_2O-(CF_2CFHOR^4CF_2CH_2O)_m-H$$

wherein:
m is 1 to about 30;
$R^4$ is perfluoroalkylene; and
X is chlorine or bromine.

24. The compound as recited in claim 23 wherein said m is about 2 to about 10.

25. The compound as recited in claim 23 wherein said $R^4$ is $-(CF_2)_s-$, wherein s is an integer of 1 to 10.

26. The compound as recited in claim 23 wherein said $R^4$ is $-[CF_2CF(CF_3)O]_t(CF_2)_u-$, wherein u is an integer of 1 to 10 and t is an integer of 1 to 20.

27. The compound as recited in claim 26 wherein said t is 1 and said u is 1.

28. The compound as recited in claim 25 wherein said s is 2.

29. The compound as recited in claim 24 wherein said $R^4$ is $-(CF_2)_s-$, wherein s is an integer of 1 to 10.

30. The compound as recited in claim 24 wherein said $R^4$ is $-[CF_2CF(CF_3)O]_t(CF_2)_u-$, wherein u is an integer of 1 to 10 and t is an integer of 1 to 20.

31. The compound as recited in claim 30 wherein said t is 1 and said u is 1.

32. The macromonomer as recited in claim 1 wherein said Q is perfluoroalkyl.

33. The macromonomer as recited in claim 1 wherein said Q is α,ω-perfluoro-n-alkylene and said z is 2.

34. The macromonomer as recited in claim 4 wherein said Q is perfluoroalkyl.

35. The macromonomer as recited in claim 4 wherein said Q is α,ω-perfluoro-n-alkylene.

36. The macromonomer as recited in claim 7 wherein said Q is perfluoroalkyl.

37. The macromonomer as recited in claim 7 wherein said Q is α,ω-perfluoro-n-alkylene and said z is 2.

38. The macromonomer as recited in claim 11 wherein said Q is α,ω-perfluoro-n-alkylene.

39. A process for the production of a macromonomer, comprising, contacting a compound of the formula $Q(CF_2CH_2OH)_z$ with a compound of the formula $CF_2=CFOR^4CF_2CH_2OH$ and a catalyst for the polymerization of hydroxy containing trifluorovinyl ethers, wherein:
Q is hydrocarbyl or substituted hydrocarbyl;
z is 2, 3 or 4; and
$R^4$ is perfluoroalkylene.

40. The process as recited in claim 39 wherein said z is 2.

41. The process as recited in claim 39 wherein said $R^4$ is $-(CF_2)_s-$, wherein s is an integer of 1 to 10.

42. The process as recited in claim 39 wherein said $R^4$ is $-[CF_2CF(CF_3)O]_t(CF_2)_u-$, wherein u is an integer of 1 to 10 and t is an integer of 1 to 20.

43. The process as recited in claim 42 wherein said t is 1 and said u is 1.

44. The process as recited in claim 41 wherein said s is 2.

45. The process as recited in claim 39 wherein said Q is perfluoroalkyl.

46. The process as recited in claim 39 wherein said Q is α,ω-perfluoro-n-alkylene and said z is 2.

47. The process as recited in claim 43 wherein said Q is α,ω-perfluoro-n-alkylene and said z is 2.

48. A process for the production of a macromonomer, comprising, contacting a compound of the formula $CF_2XCFXOR^4CF_2CH_2OH$ with a compound of the formula $CF_2=CFOR^4CF_2CH_2OH$ and a catalyst for the polymerization of hydroxy containing trifluorovinyl ethers, then dehalogenating the resulting polymer, and wherein:
X is chlorine or bromine; and
$R^4$ is perfluoroalkylene.

49. The process as recited in claim 48 wherein said $R^4$ is $-(CF_2)_s-$, wherein s is an integer of 1 to 10.

50. The process as recited in claim 48 wherein said $R^4$ is $-[CF_2CF(CF_3)O]_t(CF_2)_u-$, wherein u is an integer of 1 to 10 and t is an integer of 1 to 20.

51. The process as recited in claim 50 wherein said t is 1 and said u is 1.

52. The process as recited in claim 49 wherein said s is 2.

53. A condensation polymer, comprising, the repeat unit $$Q-[D^2]_z$$

wherein
Q is hydrocarbyl or fluorine or ether substituted hydrocarbyl;
z is 2, 3, or 4; and
each $[D^2]$ is independently $$[CF_2CH_2(OCF_2CHFOR^4CF_2CH_2)_n-O-]$$

wherein:
$R^4$ is perfluoroalkylene;
n is 1 to 30; and
provided that at least one of said n is one or more.

54. The polymer as recited in claim 53 wherein said z is 2.

55. The polymer as recited in claim 53 wherein said n is about 2 to about 10.

56. The polymer as recited in claim 54 wherein said n is about 2 to about 10.

57. The polymer as recited in claim 53 wherein said $R^4$ is $-(CF_2)_s-$, wherein s is an integer of 1 to 10.

58. The polymer as recited in claim 53 wherein said $R^4$ is $-[CF_2CF(CF_3)O]_t(CF_2)_u-$, wherein u is an integer of 1 to 10 and t is an integer of 1 to 20.

59. The polymer as recited in claim 58 wherein said t is 1 and said u is 1.

60. The polymer as recited in claim 57 wherein said s is 2.

61. The polymer as recited in claim 53 wherein said Q is perfluoroalkyl.

62. The polymer as recited in claim 53 wherein said Q is α,ω-perfluoro-n-alkylene and said z is 2.

63. The polymer as recited in claim 59 wherein said Q is α,ω-perfluoro-n-alkylene and said z is 2.

64. The polymer as recited in claim 53 which is a polyester or a polyurethane.

65. The polymer as recited in claim 56 which is a polyester or a polyurethane.

66. The polymer as recited in claim 58 which is a polyester or a polyurethane.

67. The polymer as recited in claim 63 which is a polyester or a polyurethane.

68. A free radically polymerized polymer, comprising, the repeat unit

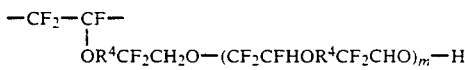

wherein:
R$^4$ is perfluoroalkylene; and
m is 1 to 30.

69. The polymer as recited in claim 68 wherein said m is about 2 to about 10.

70. The polymer as recited in claim 68 wherein said R$^4$ is —(CF$_2$)$_s$—, wherein s is an integer of 1 to 10.

71. The polymer as recited in claim 68 wherein said R$^4$ is —[CF$_2$CF(CF$_3$)O]$_t$(CF$_2$)$_u$—, wherein u is an integer of 1 to 10 and t is an integer of 1 to 20.

72. The polymer as recited in claim 71 wherein said t is 1 and said u is 1.

73. The polymer as recited in claim 70 wherein said s is 2.

74. The polymer as recited in claim 68 which is a copolymer with at least one other fluorine containing repeat unit.

75. A block copolymer in which at least one of the blocks has the structure

Q—[D$^2$]

wherein
Q is hydrocarbyl or fluorine or ether substituted hydrocarbyl;
z is 2, 3 or 4; and
each D$^2$ independently has the formula

[CF$_2$CH$_2$(OCF$_2$CHFOR$^4$CF$_2$CH$_2$)$_n$—O—]

wherein:
n is 0 to about 30;
R$^4$ is perfluoroalkylene; and
provided that at least one of said n is one or more.

76. The block copolymer as recited in claim 75 which is an A—B—A or A—B block copolymer.

77. The block copolymer as recited in claim 76 wherein the B block has the formula Q—[CF$_2$CH$_2$(OCF$_2$CHFOR$^4$CF$_2$CH$_2$)$_n$—O—]$_z$.

78. The block copolymer as recited in claim 76 wherein the A block is a polylactone.

79. The block copolymer as recited in claim 77 wherein the A block is polycaprolactone.

80. The block copolymer as recited in claim 76 wherein the A block is polycaprolactone.

81. The block copolymer as recited in claim 75 wherein said z is 2.

82. The block copolymer as recited in claim 75 wherein said n is about 2 to about 10.

83. The block copolymer as recited in claim 75 wherein said R$^4$ is —(CF$_2$)$_s$—, wherein s is an integer of 1 to 10.

84. The block copolymer as recited in claim 75 wherein said R$^4$ is —[CF$_2$CF(CF$_3$)O]$_t$(CF$_2$)$_u$—, wherein u is an integer of 1 to 10 and t is an integer of 1 to 20.

85. The block copolymer as recited in claim 75 wherein said Q is is perfluoroalkyl.

86. The block copolymer as recited in claim 75 wherein said Q is α,ω-perfluoro-n-alkylene and said z is 2.

* * * * *